(12) United States Patent
Hong

(10) Patent No.: US 6,390,437 B1
(45) Date of Patent: May 21, 2002

(54) REINFORCEMENT STRUCTURE FOR ENGINE MOUNTING PORTION OF AUTOMOBILE

(75) Inventor: Sung-Chan Hong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/611,845

(22) Filed: Jul. 7, 2000

(30) Foreign Application Priority Data

Dec. 28, 1999 (KR) ............................................. 99-63352

(51) Int. Cl.⁷ ............................................. F16M 13/00
(52) U.S. Cl. ........................ 248/559; 248/562; 180/312
(58) Field of Search ................................. 248/559, 561, 248/562, 674, 675, 637, 638; 180/311, 312

(56) References Cited

U.S. PATENT DOCUMENTS

| | | | | |
|---|---|---|---|---|
| 1,290,458 A | * | 1/1919 | Wilson | 180/274 |
| 1,303,391 A | * | 5/1919 | Reich | 180/274 |
| 5,466,033 A | * | 11/1995 | Murakami et al. | 296/189 |
| 5,472,063 A | * | 12/1995 | Watanabe et al. | 180/274 |
| 6,165,588 A | * | 12/2000 | Wycech | 428/122 |

* cited by examiner

Primary Examiner—Ramon O. Ramirez
Assistant Examiner—A. Joseph Wujciak
(74) Attorney, Agent, or Firm—Christie, Parker & Hale, LLP

(57) ABSTRACT

A reinforcement structure for engine mounting portion of automobile adapted to reinforce a structural stiffness of an engine mounting portion for mounting an engine in an engine room to thereby reduce vibration and noise transmitted to automobile body from the engine, the reinforcement structure for engine mounting portion of automobile, the portion formed by respective joining of an inner side panel, inner side reinforcement panel and engine mount reinforce bracket for mounting an engine in an engine room, the structure joined by an engine mount reinforcement member, wherein an entire bent region of the inner side reinforcement panel is joined by an engine mount reinforcement member having one surface-opened boxed shape, wherein the engine mount reinforcement member comprises a first reinforcement bracket and a second reinforcement bracket detachably joined to front/rear sides of the inner side panel, wherein the first reinforcement bracket and the second reinforcement bracket includes base surfaces respectively and centrally positioned thereon, upper extension surfaces, lower extension surfaces and lateral extension surfaces, and flange surfaces extended to both sides of the upper extension surfaces and the lower extension surfaces to join the lateral extension surface.

11 Claims, 4 Drawing Sheets

REINFORCEMENT STRUCTURE FOR ENGINE MOUNTING PORTION OF AUTOMOBILE

BACKGROUND OF THE INVENTION

1. Field of the Invention

The present invention relates to an engine mounting portion of automobile, and more particularly to a reinforcement structure for engine mounting portion of automobile adapted to reinforce a structural stiffness of an engine mounting portion to reduce vibration of automobile body caused by vibration of engine and noise generated therefrom.

2. Description of the Prior Art

Generally, an engine of an automobile generates vibration and noise during operation according to periodical change of central position by a piston therein and vertical movement of connecting rod, force of inertia generated in axial direction of a cylinder from reciprocal movement and force of inertia generated by the connecting rod swayed to the left/right sides and periodical change of turning effect applied to a crank shaft.

Accordingly, the engine is fixedly mounted at predetermined areas in an engine room (usually 3 to 4 places) via an engine mount having a proper spring strength in order to minimize vibration transmitted to an automobile body during operation and to improve durability by controlling movement of the engine.

In other words, an engine mounting portion 10 provided in the engine room for mounting an engine is a portion formed on a side frame 12 lengthily extended along the body at left/right sides of the body, where the engine mounting portion 10 is a portion frontly formed at a wheel housing part 14, as illustrated in FIG. 1.

Meanwhile, the engine mounting portion 10 is of a longitudinal-sectional shape approximately bent in "⊏" shape to allow an inner side panel 16 to be protruded into the engine room, as illustrated in FIG. 2, and the inner side panel 16 is spot-welded at the bent outer portion thereof to an inner side reinforcement panel 18 bent in approximate "⊏" shape so as to be protruded into the engine room, and the inner side reinforcement panel 18 is spot-welded at an upper bent portion thereof to an engine mount reinforcement bracket 20 bent in "⊏" shape, as illustrated in FIG. 2.

At this location, the engine mount reinforcement bracket 20 is bent in "⌐" shape at an upper bent part of the inner side reinforcement panel 18 so as to join from outside, and the engine mount reinforcement bracket 20 is separately formed thereon with two through holes 20a for mounting engine mount (not shown), as illustrated in FIG. 3.

Meanwhile, it should be apparent that the inner side panel 16 and the inner side reinforcement panel 18 are also respectively formed thereon with through holes 16a and 18a corresponding to through holes 20a of the engine mount reinforcement bracket 20.

Consequently, engine mounts are fixed to upper ends of the inner side panel 16, inner side reinforcement panel 18 and the engine mount reinforcement bracket 20 via through holes 16a, 18a and 20a, whereby an engine and a transmission are securely mounted in the engine room via the engine mounts.

However, there is a problem in the stiffness (K) of the engine mounting portion 10 according to the prior art thus described in that the stiffness (K) is only 500 Kgf/cm$^2$ whereas the stiffness (K) of body panel relative to the engine mount portion 10 should be approximately 1,000 Kgf/cm$^2$ in order to prevent in the middle the vibration generated from the engine from being transmitted to the body.

Therefore, there leaves something to be desired in the structure of conventional engine mounting portion 10 in preventing the vibration transmitted to the body from being blocked in the middle, such that when optimum control of body trembling generated by the operation of engine is required, there is needed to reinforce a structural stiffness relative to the engine mounting portion 10.

SUMMARY OF THE INVENTION

The present invention is disclosed to solve the aforementioned problems and it is an object of the present invention to provide a reinforcement structure for engine mounting portion of automobile adapted to reinforce a structural stiffness of an engine mounting portion for mounting an engine in an engine room to thereby reduce vibration and noise transmitted to automobile body from the engine.

In accordance with the object of the present invention, there is provided a reinforcement structure for engine mounting portion of automobile, the portion formed by respective joining of an inner side panel, inner side reinforcement panel and engine mount reinforcement bracket for mounting an engine in an engine room, the structure joined by an engine mount reinforcement member, wherein an entire bent region of the inner side reinforcement panel is joined by an engine mount reinforcement member having one surface-opened boxed shape, wherein the engine mount reinforcement member comprises a first reinforcement bracket and a second reinforcement bracket detachably joined to front/rear sides of the inner side panel, wherein the first reinforcement bracket and the second reinforcement bracket includes base surfaces respectively and centrally positioned thereon, upper extension surfaces, lower extension surfaces and lateral extension surfaces, and flange surfaces extended to both sides of the upper extension surfaces and the lower extension surfaces to join the lateral extension surfaces.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 1:
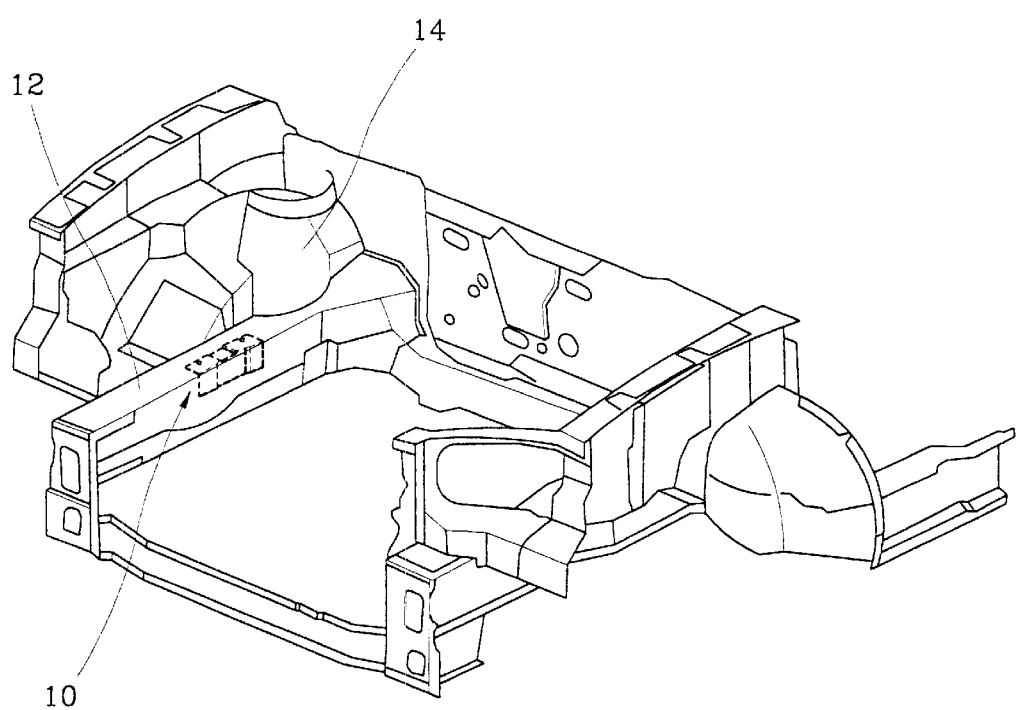
FIG. 1 is a schematic diagram for illustrating an engine mount area in an engine room according to a conventional automobile.
Figure 2:
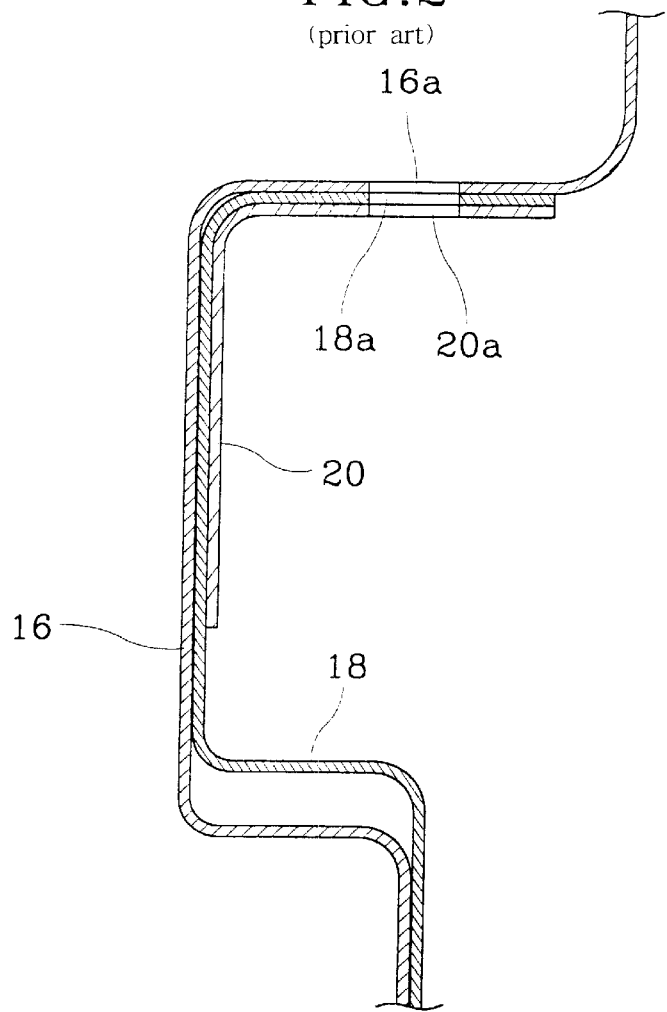
FIG. 2 is a longitudinal sectional view of the engine mount area illustrated in FIG. 1.
Figure 3:
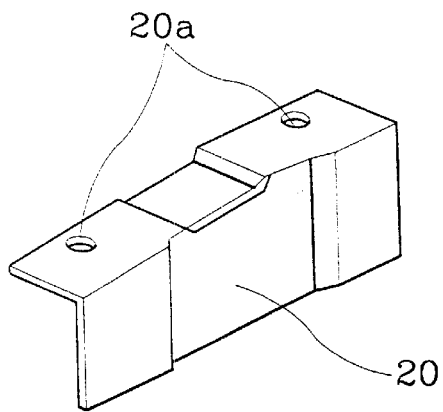
FIG. 3 is a perspective view for illustrating an engine mount reinforcement bracket illustrated in FIG. 2.
Figure 4:
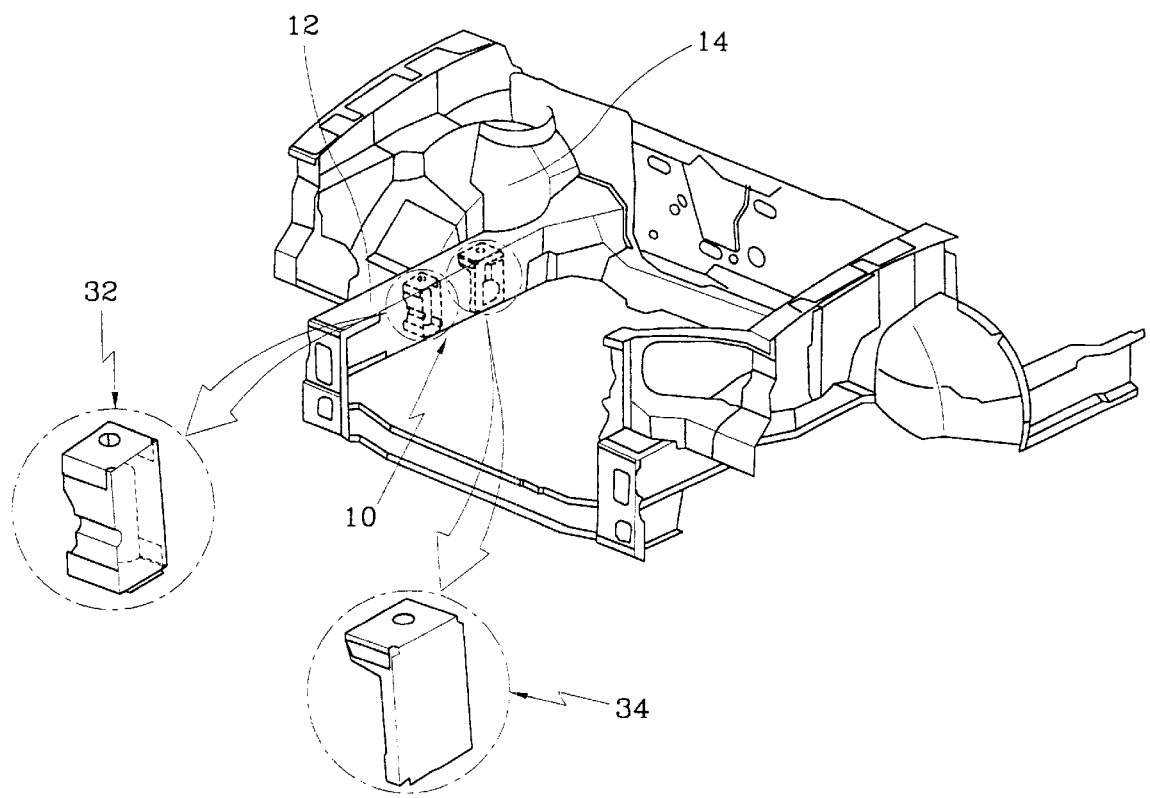
FIG. 4 is a schematic diagram for illustrating an engine mount area in engine room according to the present invention.
Figure 5:
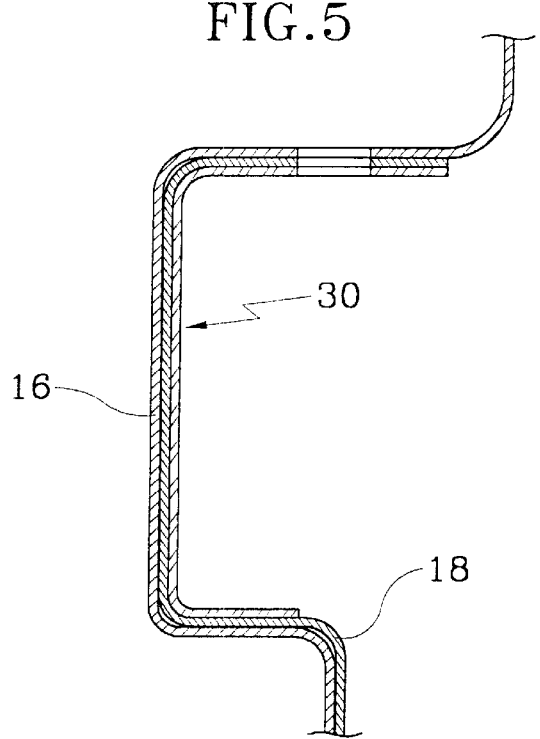
FIG. 5 is a longitudinal sectional view for illustrating an engine mount portion illustrated in FIG. 4.
Figure 6:
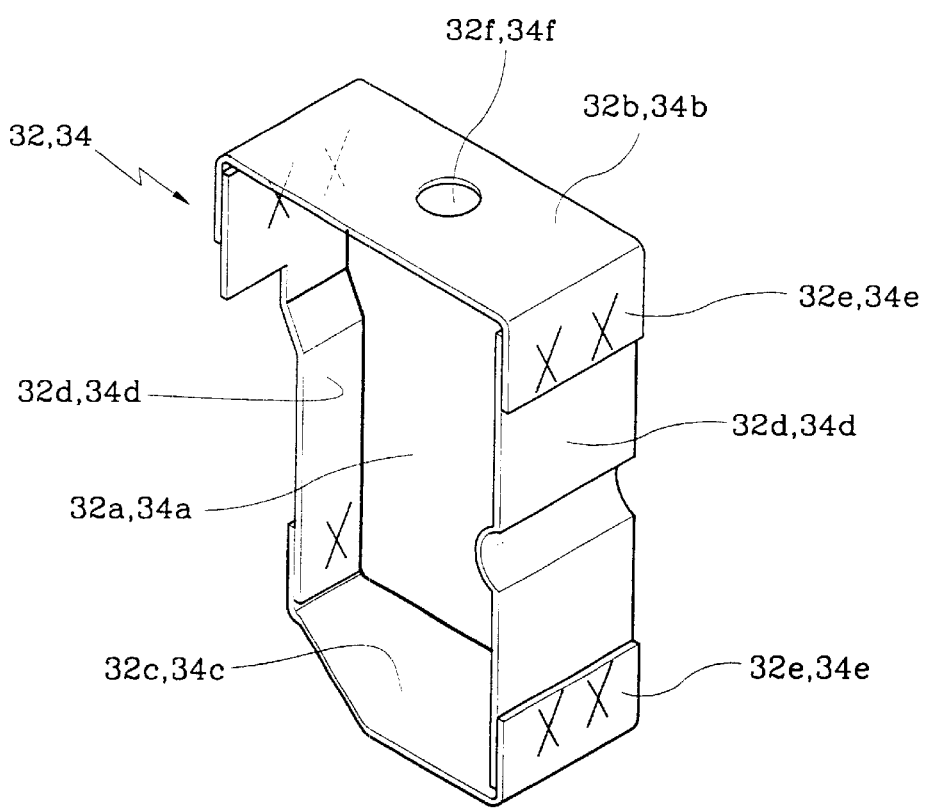
FIG. 6 is a perspective view for illustrating an engine mount reinforcement bracket illustrated in FIG. 5.

FIG. 4 is a schematic diagram for illustrating an engine mount area in an engine room according to the present invention, FIG. 5 is a longitudinal sectional view for illustrating an engine mount portion illustrated in FIG. 4 and FIG. 6 is a perspective view for illustrating an engine mount reinforcement bracket illustrated in FIG. 5, where like reference numerals as in FIGS. 1 and 2 are used for designation of like or equivalent parts or portions, and redundant explanation will be omitted.

An engine mounting portion 10 according to the present invention is a portion arranged at forward area of a wheel housing portion 14 on a side frame 12 mounted to left/right sides of automobile body, where the engine mounting portion 10 includes an inner side panel 16 bent approximately in "⊏" shape so as to protrude into the engine room.

The inner side panel 16 is spot-welded at an external bent area thereof by an inner side reinforcement panel 18 bent approximately in "⊏" shape so as to protrude into the engine room and the inner side reinforcement panel 18 is joined by an engine mount reinforcement member 30 of one side-opened and box-shaped form so as to surface-contact an entire area of bent area of the inner side panel 16.

The engine mount reinforcement member 30 includes a first reinforcement bracket 32 and a second reinforcement bracket 34, each arranged at front and rear side thereof with a predetermined space therebetween on the engine mounting portion 10, where the first and second reinforcement brackets 32 and 34 are integrally disposed with upper extension surfaces 32b and 34b, lower extension surfaces 32c and 34c and lateral extension surfaces 32d and 34d outwardly extended from centrally-positioned rectangular base surfaces 32a and 34a, as illustrated in FIG. 6.

Furthermore, the upper extension surfaces 32b and 34b and the lower extension surfaces 32c and 34c are integrally mounted with flange surfaces 32e and 34e of extended shape in both sides thereof, where the flange surfaces 32e and 34e are respectively spot-welded to upper side and lower side of the lateral extension surfaces 32d and 34d, being bent to cover upper and lower sides of the lateral extension surfaces 32d and 34d while the upper extension surfaces 32b and 34b, lower extension surfaces 32c and 34c and lateral extension surfaces 32d and 34d are bent, such that the first and second reinforcement brackets 32 and 34 can each be formed as a reinforcement member having a boxed shape with one side opened.

Meanwhile, it should be apparent that the first and second reinforcement brackets 32 and 34 are also formed at upper extended surfaces 32b and 34b with through holes 32f and 34f corresponding to through holes 16a and 18a respectively formed at upper ends of the inner side panel 16 and the inner side reinforcement panel 18.

Accordingly, the engine mount reinforcement member 30 is surface-contacted externally with the whole area of the bent portion of the inner side reinforcement panel 18, where, the first and second reinforcement brackets 32 and 34 are respectively surface-contacted at upper extension surfaces 32b and 34b and lower extension surfaces 32c and 34c thereof with upper surface and lower surface of the inner side reinforcement panel 18, while, the first and second reinforcement brackets 32 and 34 are respectively surface-contacted with lateral surface of vertical shape at the inner side reinforcement panel 18, where each corresponding areas are joined by spot-welding.

As a result, structural stiffness of the engine mounting portion 10 is further strengthened via engine mount reinforcement member 30 having a boxed shape with an opening at one side.

Because the engine mount reinforcement member 30 is surface-contacted and joined at the entire bent areas of the inner side reinforcement panel 18 at the engine mounting portion 10, stiffness of member at vertical direction of the inner side reinforcement panel 18 is reinforced by support of lateral extension surfaces 32d and 34d of the first and second reinforcement brackets 32 and 34.

In other words, the engine mounting portion 10 according to the present invention is spot-welded and joined by the engine mount reinforcement member comprising first and second reinforcement brackets 32 and 34 surface-contacting the entire bent area of the inner side reinforcement panel 18, such that stiffness (K) of body panel relative to the engine mounting portion 10 becomes about 1,000 Kgf/cm$^2$ which can minimally reduce the vibration and noise transmitted to the automobile body generated by operation of the engine.

As apparent from the foregoing, there is an advantage in the reinforcement structure for engine mounting portion of automobile according to the present invention thus described in that structural stiffness of the engine mounting portion 10 formed for supporting an engine in an engine room is reinforced by the engine mount reinforcement member 30 having a boxed shape and one side opened, to thereby reduce noise and vibration transmitted to the body from the engine, such that the vibration and noise felt by passengers in the automobile can be minimized.

What is claimed is:

1. A reinforcement structure for engine mounting portion of an automobile, the portion formed by respective joining of an inner side panel, an inner side reinforcement panel and an engine mount reinforcement bracket for mounting an engine in an engine room, the structure joined by an engine mount reinforcement member wherein an entire bent region of the inner side reinforcement panel is joined by the engine mount reinforcement member comprising a first reinforcement bracket and a second reinforcement bracket detachably joined to front/rear sides of the inner side panel wherein the first reinforcement bracket and the second reinforcement bracket include base surfaces respectively and centrally positioned thereon, upper extension surfaces, lower extension surfaces and lateral extension surfaces outwardly extended from the base surfaces, and flange surfaces extended to both sides of the upper extension surfaces and lower extension surfaces to join the lateral extension surfaces.

2. A reinforced structure for mounting an automobile engine, the structure comprising:
   an inner side panel for accommodating an engine mount;
   an inner side reinforcement panel having a bent region and coupled to the inner side panel;
   a first reinforcement bracket coupled to the inner side reinforcement panel bent region; and
   a second reinforcement bracket coupled to the inner side reinforcement panel bent region.

3. A reinforced structure as recited in claim 2 wherein each of the first and second reinforcement brackets comprises:
   a base surface;
   a first extension surface extending outwardly from the base surface;
   a second extension surface opposite the first extension surface and extending outwardly from the base surface;
   a first lateral extension surface extending outwardly from the base surface; and
   a second lateral extension surface opposite the first lateral extension surface and extending outwardly from the base surface.

4. A reinforced structure as recited in claim 3 wherein each of the first and second brackets further comprises:
- a first flange surface extending from a first side of the first extension surface;
- a second flange surface extending from a second side of the first extension surface opposite the first side;
- a first flange surface extending from a first side of the second extension surface; and
- a second flange surface extending from a second side of the second extension surface opposite the first side.

5. A reinforced structure as recited in claim 4 wherein for each of the first and second brackets, the first and second flanges of each of the first and second extension surfaces are joined to the first and second lateral extension surfaces, respectively.

6. A reinforced structure as recited in claim 5 wherein the bent region of the inner side reinforcement panel comprises a first surface opposite a second surface, wherein the first extension surface of each bracket is connected to the first surface of the inner side reinforcement panel bent region and wherein the second extension surface of each bracket is connected to the second surface of the inner side reinforcement panel bent region.

7. A reinforced structure as recited in claim 6 wherein the inner side panel comprises a bent region having a surface, and wherein the inner side reinforcement panel bent region first surface is joined to said inner side panel surface.

8. A reinforced structure as recited in claim 7 wherein said inner side panel bent region surface comprises two openings, wherein said reinforcement panel bent region first surface comprises two openings aligned with said two openings of the inner side panel, and wherein each bracket first extension surface comprises an opening aligned with one of said openings of said inner panel and with one of said openings of said reinforcement panel bent region first surface, and wherein an engine mount is coupled to said structure through each bracket first extension surface, inner panel and reinforcement panel bent region aligned openings.

9. A reinforced structure as recited in claim 2 wherein the inner side reinforcement panel comprises a "C" shape in cross-section.

10. A reinforced structure as recited in claim 9 wherein the inner side panel comprises a portion having a "C" shape in cross-section.

11. A reinforced structure as recited in claim 10 wherein the inner side reinforcement panel is fitted within and joined to the portion of the inner side panel having the "C" shape cross-section.

* * * * *